(12) United States Patent
Kawalkar

(10) Patent No.: US 9,671,868 B2
(45) Date of Patent: Jun. 6, 2017

(54) SYSTEM AND METHOD FOR VOLUMETRIC COMPUTING

(71) Applicant: HONEYWELL INTERNATIONAL INC., Morristown, NJ (US)

(72) Inventor: Amit Nishikant Kawalkar, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 32 days.

(21) Appl. No.: 13/915,232

(22) Filed: Jun. 11, 2013

(65) Prior Publication Data

US 2014/0361972 A1    Dec. 11, 2014

(51) Int. Cl.
*G09G 5/00* (2006.01)
*G06F 3/01* (2006.01)
*G06F 3/00* (2006.01)
*G06F 3/0488* (2013.01)

(52) U.S. Cl.
CPC ............. *G06F 3/017* (2013.01); *G06F 3/005* (2013.01); *G06F 3/04883* (2013.01); *G06F 3/04886* (2013.01); *G06F 2203/04108* (2013.01)

(58) Field of Classification Search
CPC ...... G06F 3/017; G06F 3/04883; G06F 3/005; G06F 3/04886; G06F 2203/04108
USPC ........................................................ 345/156
See application file for complete search history.

(56) References Cited

U.S. PATENT DOCUMENTS

| 6,276,211 | B1 | 8/2001 | Smith |
| 8,089,483 | B2 | 1/2012 | Tanaka |
| 8,111,239 | B2 | 2/2012 | Pryor et al. |
| 8,230,367 | B2 | 7/2012 | Bell et al. |
| 8,451,236 | B2 | 5/2013 | Duarte et al. |
| 2002/0036617 | A1 | 3/2002 | Pryor |
| 2005/0275638 | A1 | 12/2005 | Kolmykov-Zotov |

(Continued)

FOREIGN PATENT DOCUMENTS

| EP | 2600108 A1 | 6/2013 |
| EP | 2620863 A2 | 7/2013 |

(Continued)

OTHER PUBLICATIONS

Grossman, T.: "Hover Widgets: Using the Tracking State to Extend the Capabilities of Pen-Operated Devices" CHI 2006, Apr. 22-28, 2006, Montréal, Québec, Canada.

(Continued)

*Primary Examiner* — Jonathan Boyd
(74) *Attorney, Agent, or Firm* — Lorenz & Kopf, LLP

(57) ABSTRACT

A system and method is provided for analyzing the movement of an object. The system is comprised of a sensor that is coupled to a processor that is configured to generate a volume that corresponds to a predefined area and the location of the object. The sensor detects the movement of the object and determines if the object's movement is within the volume. If the movement is within the volume, then an information channel is created between the volume and the user defined algorithm. The movement is then compared with the requirements of the user defined algorithm and accepted if the movement meets the requirements. Otherwise, the object's movement is discarded if the movement is not within the volume or does not meet the requirements of the user defined algorithm.

13 Claims, 8 Drawing Sheets

(56) References Cited

U.S. PATENT DOCUMENTS

| | | |
|---|---|---|
| 2010/0107099 A1 | 4/2010 | Frazier et al. |
| 2010/0234094 A1 | 9/2010 | Gagner et al. |
| 2011/0069019 A1 | 3/2011 | Carpendale et al. |
| 2011/0127380 A1 | 6/2011 | Orgerie et al. |
| 2011/0193939 A1 | 8/2011 | Vassigh et al. |
| 2011/0216060 A1 | 9/2011 | Weising et al. |
| 2011/0296353 A1* | 12/2011 | Ahmed .................. G06F 3/017 715/848 |
| 2012/0235904 A1 | 9/2012 | Plagemann et al. |
| 2012/0280901 A1 | 11/2012 | Kim |
| 2012/0327125 A1 | 12/2012 | Kutliroff et al. |
| 2013/0265220 A1 | 10/2013 | Fleischmann |
| 2013/0331993 A1 | 12/2013 | Detsch |
| 2014/0071037 A1 | 3/2014 | Cohen |
| 2014/0198954 A1 | 7/2014 | Bulzacki |
| 2014/0358332 A1* | 12/2014 | Colmenares ............ G06F 3/017 701/3 |
| 2015/0035750 A1 | 2/2015 | Bailey et al. |

FOREIGN PATENT DOCUMENTS

| | | |
|---|---|---|
| EP | 2741171 A1 | 6/2014 |
| WO | 2010105084 A1 | 9/2010 |
| WO | 2011017474 A1 | 2/2011 |
| WO | 2013018099 A2 | 2/2013 |

OTHER PUBLICATIONS

Apple Wins Patents for Wild 3D Gesturing, Autofocus & More, Jul. 31, 2012; URL: http://www.patentlyapple.com/patently-apple/2012/07/apple-wins-patents-for-wild-3d-gesturing-autofocus-more.html.

EP Search Report for Application No. 14169549.4 dated Nov. 10, 2014.

Omek Gesture Recognition and Tracking Technology; Keep your hands where I can see them: Designing for Touch-Free Interaction; Jun. 4, 2013.

Jianming Guo; Hand Gesture Recognition and Interaction with 3D Stereo Camera; COMP8740 Project Report; Department of Computer Science Australian National University, Nov. 2011.

Kai Nickel, et al.; Recognition of 3D-Pointing Gestures for Human-Robot-Interaction; Universitat Karlsruhe (TH), Germany.

Daniela G. Trevisan, et al.; Supporting the Design of Multimodal Interactions: A Case Study in a 3D Sculpture Application; XII Symposium on Virtual and Augmented Reality, Natal, RN, Brazil—May 2010.

Verifying Advantages of Two-Handed Interaction, hoofdstuk 4 Aug. 25, 1999; pp. 123-152.

USPTO Office Action for U.S. Appl. No. 14/168,426 Notification date Nov. 19, 2015.

EP Extended Search Report for Application No. 15151683.8; Dated Jun. 30, 2015.

"Cockpit Gesture Recognition," Ratan Software URL:http://www.rattansoftware.com/reasearch/cockpit-gestures-recognition/ [Retreived from internet:], Jan. 1, 2013.

USPTO Final Office Action; Notification Date Apr. 22, 2016; U.S. Appl. No. 14/168,426.

EP Communication for Application No. 14 169 549.4-1959 dated Dec. 1, 2016.

USPTO Office Action for U.S. Appl. No. 14/168,426 dated Dec. 22, 2016.

EP Summons for Application No. 14169549.4-1959/2813920 dated Sep. 15, 2016.

Jean-Noel Perbet, et al.; Interactive Display Concept for the Next-Generation Cockpit, Publication Date Jun. 5, 1991.

* cited by examiner

SYSTEM AND METHOD FOR VOLUMETRIC COMPUTING

TECHNICAL FIELD

Embodiments of the subject matter described herein relate generally to computer systems. More particularly, embodiments of the subject matter described herein relate to a system and method for volumetric computing for use in, for example, flight deck applications.

BACKGROUND

New and innovative ways of interacting with computers are being developed to increase usability of computers. For example, touch screen interfaces can allow users to provide commands to a computer without a mouse and/or keyboard. However, their adoption into multiple industries is constrained by problems associated with inadvertent user interactions; which may be defined as any system detectable interaction issued to the touch screen interface without the user's consent. That is, an inadvertent interaction may be caused by bumps, vibrations, or other objects, resulting in possible system malfunctions or operational errors. For example, potential sources of inadvertent interactions include but are not limited to accidental brushes by a user's hand or other physical objects.

Another interface that is currently being developed, which may be more immune to inadvertent user interactions is a gesture recognition interface. However, this interface is constrained by problems that require a high degree of preprocessing and complex algorithms to extract and analyze the user's interaction from the surrounding environment. Such methods depend upon three-dimensional (3D) imaging information sensed across the visible sensing volumetric range. This in turn limits the accuracy, reliability, and precision of the system, and presents significant technology challenges for aircraft flight deck applications. One proposed method of avoiding these issues relies on a user holding or otherwise manipulating a controller or handheld device. These controllers may act as an extension of the body so that when a gesture is performed, some of the motions can be recognized by the system. However, this proposed method requires the user to hold the controller or handheld device to interact with the computer. In addition, only limited types of motions are recognized by the system.

In view of the foregoing, it would be desirable to provide a system and method for providing an improved 3D gesture technology for use in flight deck applications to improve pilot productivity. It would further be desirable to provide a system and method that efficiently provides reliable and accurate gesture recognition without requiring the user to hold a controller or handheld device. This would reduce inadvertent activations of control functions, improve productivity, and enhance the user's overall experience.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for analyzing an object's movement. The method comprises detecting a location of the object and generating a volume that corresponds to a predefined area and the location of the object. The movement of the object is then detected and analyzed to determine if the object's movement is within the volume.

Also provided is a method for analyzing a user's interaction with a display. The method comprises detecting a location of the user and generating a volume that corresponds to a region on the display and the location of the user. The user interaction is then detected and analyzed to determine if the user's interaction is within the volume.

Furthermore, a system for volumetric computing onboard an aircraft is provided. The system comprises a display system coupled to a processor that is configured to (a) generate a volume that corresponds to a region on the display; (b) detect a user interaction with the display; and (c) determine if the user interaction is within the volume.

BRIEF DESCRIPTION OF THE DRAWINGS

A more complete understanding of the subject matter may be derived by referring to the detailed description and claims when considered in conjunction with the following figures, wherein like reference numerals refer to similar elements throughout the figures, and wherein:

DETAILED DESCRIPTION

Figure 1:
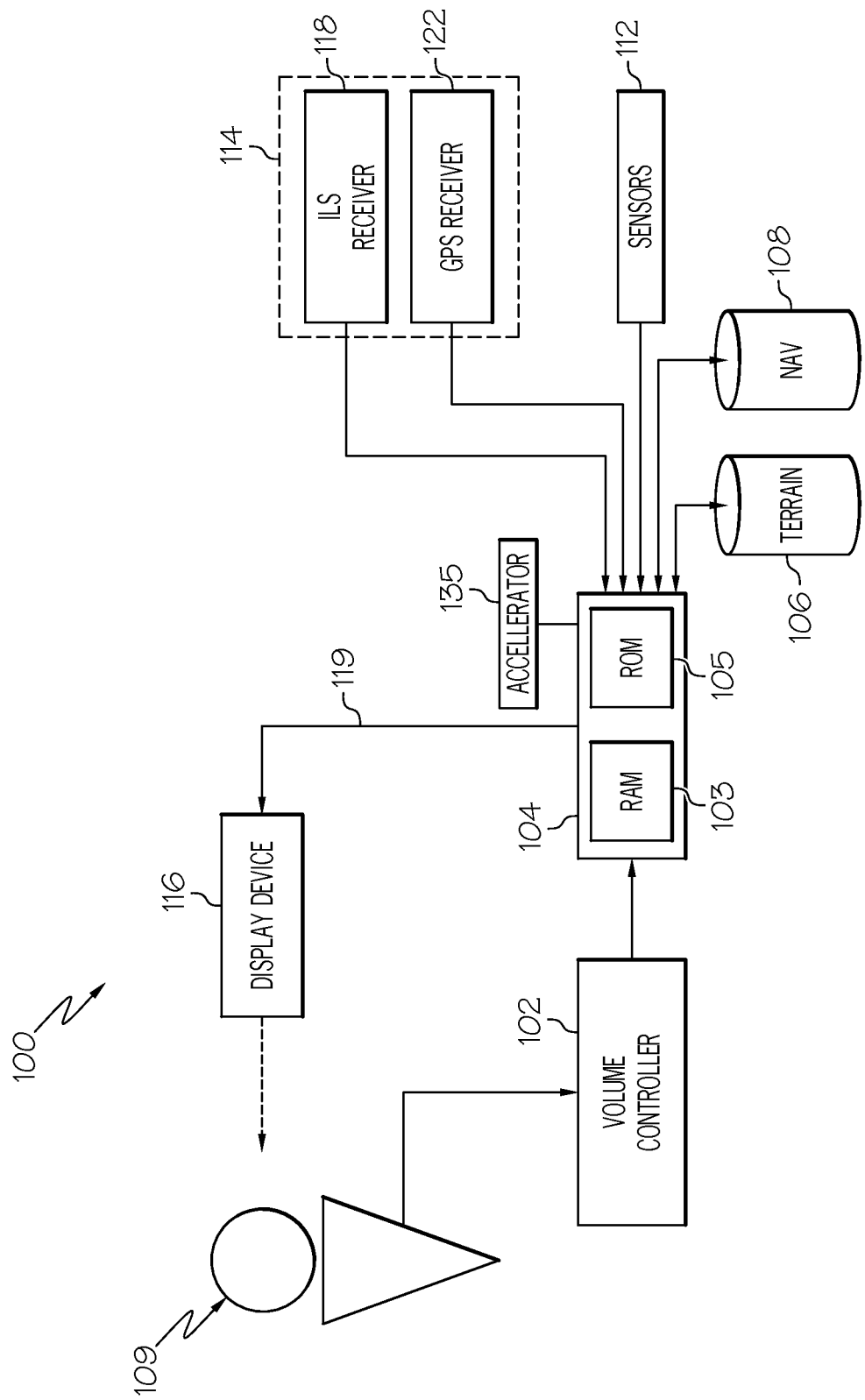
FIG. 1 is a block diagram of an aircraft cockpit system including a display and a interaction controller.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Disclosed herein is a novel system for volumetric computing for use in conjunction with a display device on, for example, an aircraft flight deck, which reduces inadvertent user interactions. This is accomplished through the use of a sensor placed proximate to the display device, which is coupled to an interaction controller. The volumetric computing system enables users or developers to interact with the system to activate control functions without making physical contact with the system. This extends the system beyond the limits of a particular operating system or application to which the user's inputs are directed. Presented herein for purposes of explication are certain exemplary embodiments illustrating how the volumetric computing system may be employed on a particular device. For example, the embodiment of an interface suitable for use in aviation applications will be discussed.

However, it should be appreciated that this explicated example embodiment could be implemented for use with aircraft gate alignment, product replacement on shelves, or any other tangible interaction application. For example, one application of the volumetric computing system may be in a video surveillance system. Where a sensor would rotate around an axis to detect humans and objects in a crowd. One region of the sensor may be configured for detecting specific body movement algorithms, while another region of the sensor may be configured to detect the number of people within the volume. Each region then may have individual user defined algorithms to track defined security threats to create a dynamic alerting system. Nevertheless, described below is an explicated example embodiment, which is merely an example and a guide for implementing the novel systems and method herein on any user interface in any industrial, commercial, aviation, or consumer electronics application. As such, the examples presented herein are intended as non-limiting.

FIG. 1 illustrates a flight deck system 100 includes a volume controller 102, a processor 104, one or more terrain databases 106 sometimes referred to as a Terrain Avoidance and Warning System (TAWS), one or more navigation databases 108, sensors 112, external data sources 114, and one or more display devices 116. The volume controller 102 is in operable communication with the processor 104 and is configured to receive input from a user 109 (e.g. pilot, co-pilot, flight crew, and etc.) and, in response to the user input, supplies command signals to the processor 104. The volume controller 102 is described in greater detail below in connection with FIG. 2.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, and altitude. The ILS 118 provides aircraft with horizontal (or localizer) and vertical (or glide slope)

guidance just before and during landing and, at certain fixed points, indicates the distance to the reference point of landing on a particular runway. The GPS receiver 124 is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat screen displays such as various types of LCD (liquid crystal display) and TFT (thin film transistor) displays. The display devices 116 may additionally be implemented as a screen mounted display, or any one of numerous known technologies. It is additionally noted that the display devices 116 may be configured as any one of numerous types of aircraft flight deck displays. For example, it may be configured as a multi-function display, a horizontal situation indicator, or a vertical situation indicator, just to name a few. In the depicted embodiment, however, one of the display devices 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein.

Figure 2:
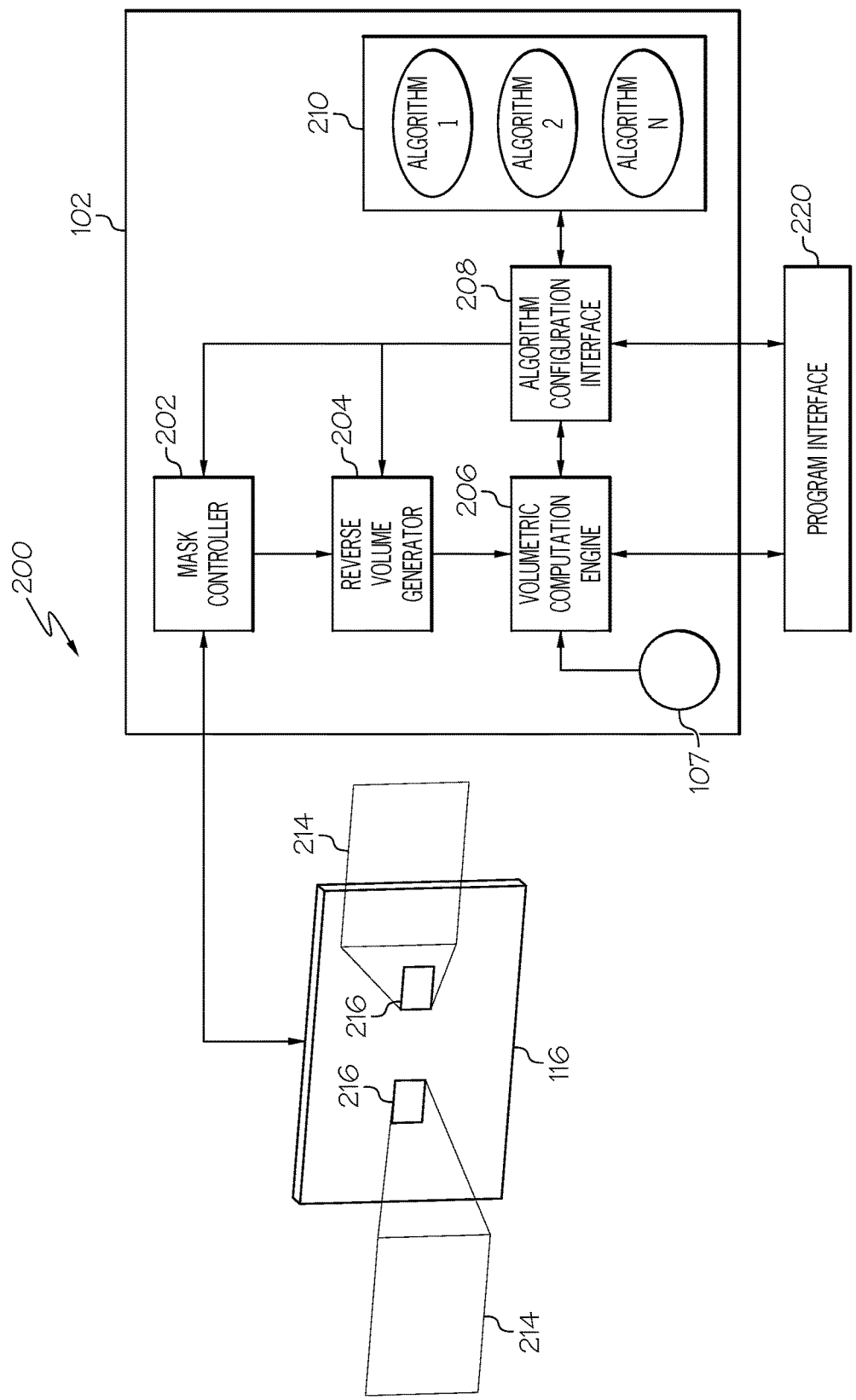
FIG. 2 is a block diagram of an exemplary embodiment of a volumetric computing system.

FIG. 2 illustrates an exemplary embodiment of a volumetric computing system 200 comprising a volume controller 102 coupled to a display device 116 and a program interface 220. The volume controller 102 is comprised of a mask controller 202 coupled to a display device 116, a reverse volume generator 204 coupled to receive an input from mask controller 202, and a volumetric computation engine 206 coupled to receive inputs from sensor 107, reverse volume generator 204, and program interface 220. An algorithm configuration interface 208 is coupled to mask controller 202, reverse volume generator 204, volumetric generation engine 206, and algorithm database 210. The mask controller 202 defines the number and location of the regions 216 that are rendered on the display device 116. This is done by retrieving information from the program interface 220. The retrieved information includes, but is not limited, to the locations and functions of the regions 216 that will be rendered on the display 116. Each region 216 that is rendered on the display controls a function of the aircraft, for example cabin lights, seat belt sign, autopilot, etc. The size, location, and other characteristics of the regions may be based on the functions the regions control. For example, a region that controls a significant function of the aircraft (e.g. autopilot, flaps, or throttle) may be smaller in size and located in a remote area of the screen to help prevent accidental activation. However, regions that control less significant functions of the aircraft (e.g. cabin lights, seat belt sign, and intercom) may be larger and located towards the middle of the screen.

Figure 3:
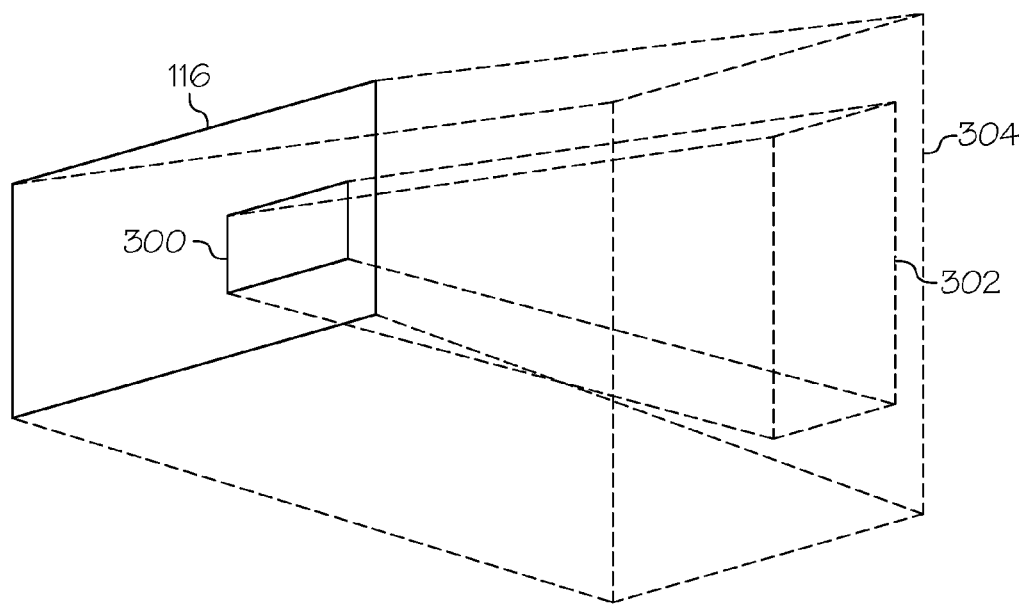
FIGS. 3 and 4 illustrate examples of volumes that are utilized by the volumetric computing system of FIG. 2.
Figure 4:
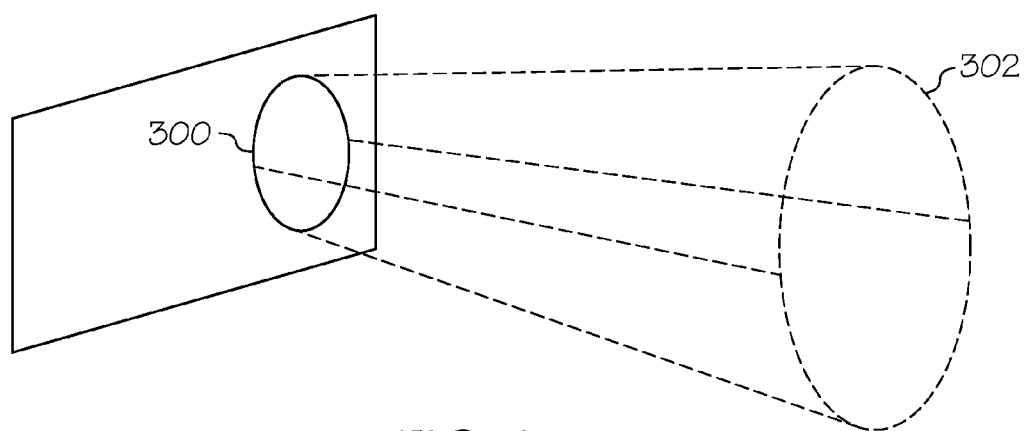

Information from the algorithm configuration interface 208 and the mask controller 202 is utilized by the reverse volume generator 204 to generate the volume 214. Each volume 214 corresponds to a region 216 rendered on the display 116, which is projected into a space proximate to the display 216 and based upon the object detected by the senor 107. Typically, the space in front of the screen is divided into individual volumes 214 that are defined by projections of the regions 216 that are rendered on the display device 116. However, it should be recognized that the projected volume could be in any direction relative to the screen. Referring to FIGS. 3 and 4, which illustrate exemplary embodiments of volumes that have been projected into the space in front of the display 116. Display device 116 renders regions 300 and 400 that control functions of the aircraft as described above. Volumes 302 and 402 are generated to correspond to objects detected by the sensor 107 and each region 300 and 400, respectively. Each region, for example region 300, represents a percentage of the entire volume 304 of the display device 116. This permits multiple volumes to be present within the volume 304 of the display device 116. This in turn reduces the amount of information that must be processed to receive a valid user interaction.

In addition, it should be appreciated that the depth, width, and height of volume 302 may be may be an exact projection of the region 300 or the volume may be altered to a different shape or distance to meet design requirements. For example, the rectangular region 300 has a greater length then height, while the volume 302 has a greater height then length. Also, FIG. 4 illustrates how an oval region 300 may be projected into space creating volume 302. Furthermore, the depth of the volume 302 is configurable but is limited by the range of the sensor 107 (FIG. 2) and/or other design requirements. In an exemplary aircraft embodiment, the maximum depth of the volume 302 may be set equal to the distance form display device 116 to the seated location of the pilot. By setting the depth to this distance, there is a reduction in the amount of information that must be processed, while at the same time capturing all gestures made by the pilot.

Referring back to FIG. 2, the volumetric computation engine 206 receives user interactions from sensor 107 and divides the user interaction into individual parts depending on the location of the user interaction and the boundaries of the volumes 214. The algorithm configuration interface 208 generates the corresponding information channels between the volumes that contained the user interaction and the user defined algorithms stored in the algorithm database 210. The algorithm database 210 allows a user or designer to define different interaction requirements depending on the individual region 216. For example, a designer may require a more complex user interaction to activate a region that controls a significant function of the aircraft. While, a less complex user interaction may be required for a less significant function. Such interactions include but are not limited to those described in U.S. patent application Ser. No. 13/777,737 filed Feb. 26, 2013 entitled "System and Method for Interacting With a Touch Screen Interface Utilizing a Hover Gesture Controller," and assigned to the instant assignee.

Figure 5:
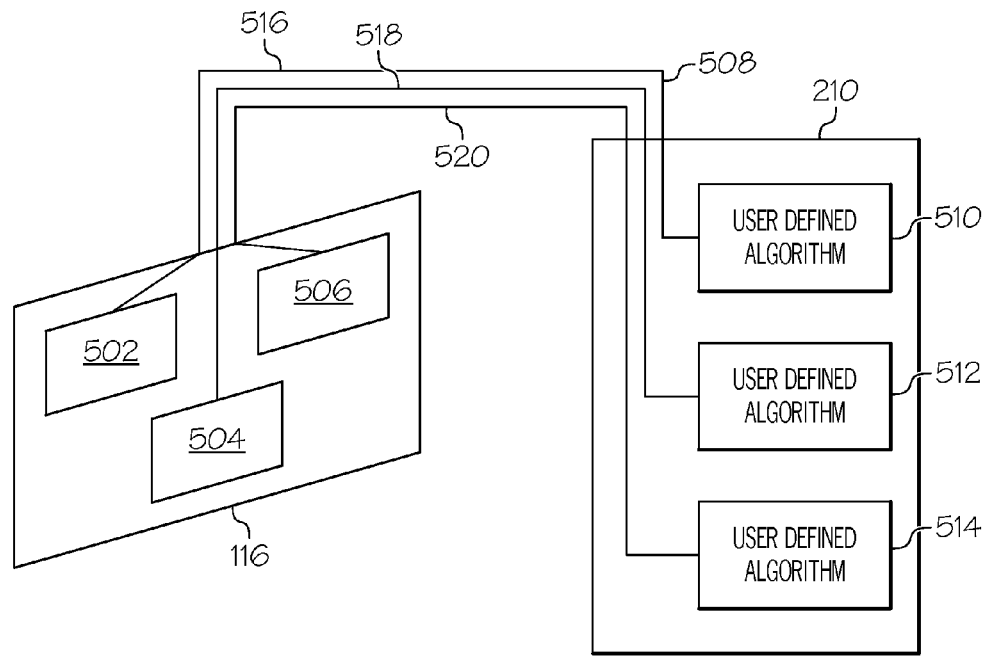
FIG. 5 illustrates an exemplary embodiment of regions rendered on a display and their associated user defined algorithms utilized by the volumetric computing system of FIG. 2.

FIG. 5 illustrates an exemplary embodiment of regions rendered on a display and their associated user defined algorithms. Depending on the location of the user interaction, three different possibilities may exist. The first possibility is when a user interaction is contained within a single volume. For example, a user interaction is contained within the volume that corresponds to region 502. In this case, an information channel 516 is generated between the region 502 and the user defined algorithm 510. The user interaction is then compared with the requirements set forth in the user defined algorithm 510. If the user interaction meets the requirements, then the user interaction is provided to program interface 220 (FIG. 2). However, if the user interaction does not meet the requirements, then the user interaction is discarded.

The second possibility occurs when the user interaction is located in multiple volumes or a volume and a non-volume. If this takes place, the volumetric computation engine 206 (FIG. 2) divides the user interaction into multiple parts, multiple information channels are created, and each part of the user interaction is then individually compared to each user defined algorithm. For example, a user interaction is located in the volumes that correspond to regions 502, 504, and 506. The user interaction is then divided into multiple parts, which contain only the user interaction within that individual volume. Multiple information channels 516, 518, and 520 are then created for each part of the divided user interaction. Each part of the divided user interaction is compared to the requirements set forth in each of the corresponding user defined algorithm 510, 512, and 514, respectively. If a part of the user interaction meets the requirements of the user defined algorithm, then the user interaction is provided to program interface 220 (FIG. 2). However, the parts of the user interaction that do not meet the requirements of the user defined algorithm, are discarded.

The third possibility occurs when the user interaction is not located within a volume. If this takes place the user interaction is discarded. It should be appreciated that the creation of individual channels to communicate information between the region 216 and the algorithm database 210 provides for flexibility in prioritizing, scheduling, and interaction requirements for each individual region. Furthermore, this permits volume controller 102 (FIG. 2) to discard user interactions that do not meet the various threshold and performance requirements, reducing necessary processing power and time, while improving accuracy and reliability.

Figure 6:
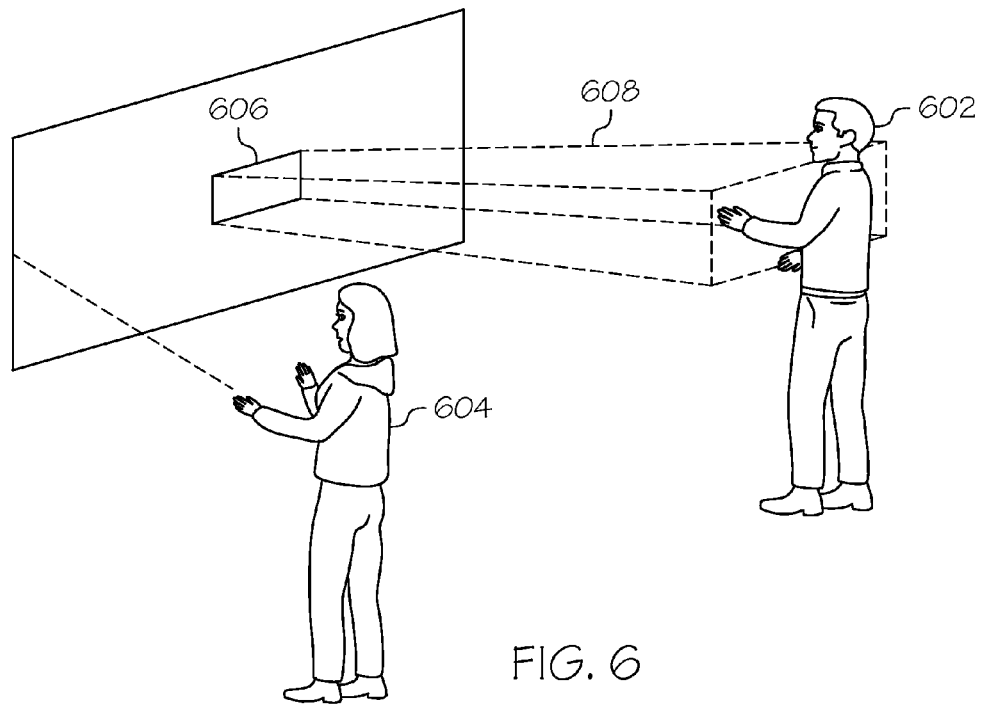
FIGS. 6, 7, 8, 9, and 10 illustrate users interacting with volumes in the volumetric computing system of FIG. 2.
Figure 7:
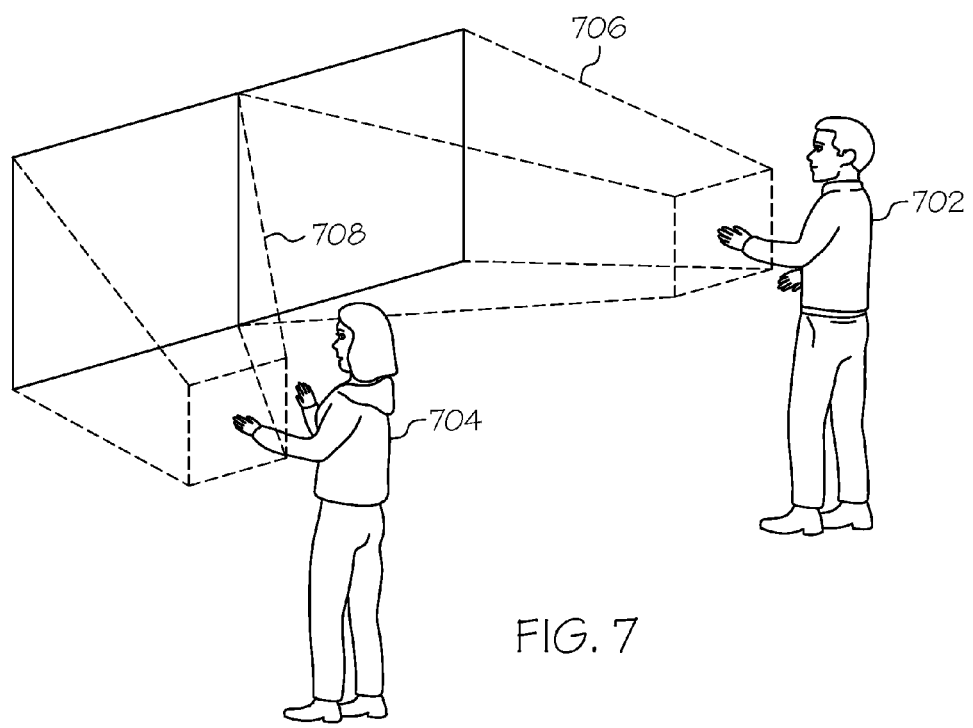

FIGS. 6, 7, 8, 9, and 10 illustrate users interacting with volumes in the volumetric computing system of FIG. 2. In FIG. 6, User 602 is validly interacting within volume 608 that corresponds to region 606. However, user 604 is not interacting within a defined volume, and his interactions will be discarded. Referring to FIG. 7, both users 702 and 704 are validly interacting within volumes 706 and 708, respectfully. This illustrates how the volumetric computation engine 206 (FIG. 2) may gather information for the sensor 107 (FIG. 1) about the location of the users and alter the volumes based on user location. For example, FIG. 7 may depict a flight deck with a panoramic display. The display may be split to provide individual workspaces for each user 702 and 704. User 702 could only interact with the regions on his part of the screen, and the same would apply to user 704. In this manner, inadvertent interactions by moving objects or accidental activations of functions by the other user may be avoided. In addition, the volumes can be adjusted for 'arm-rest-support-gesture-interactions', which may reduce user fatigue.

Figure 8:
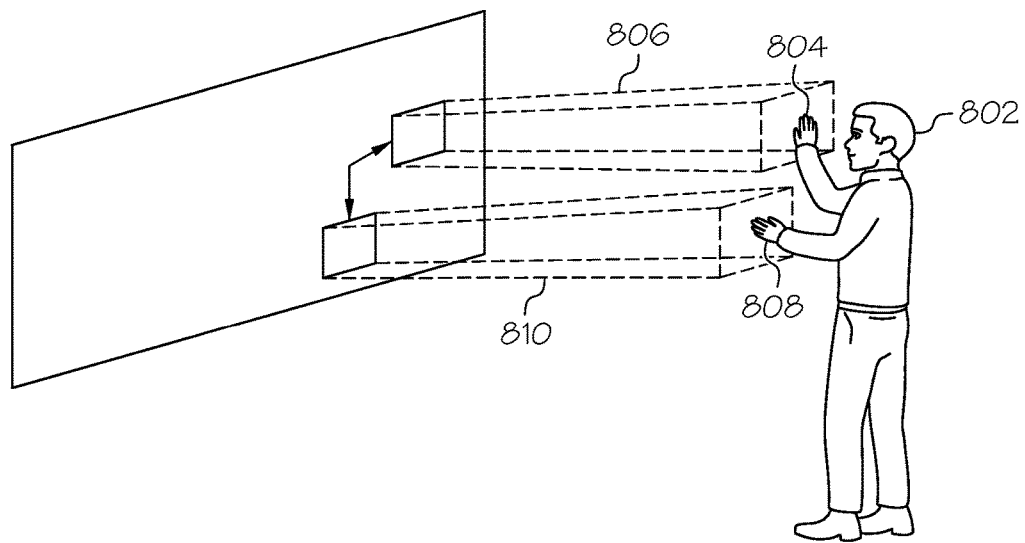
Figure 9:
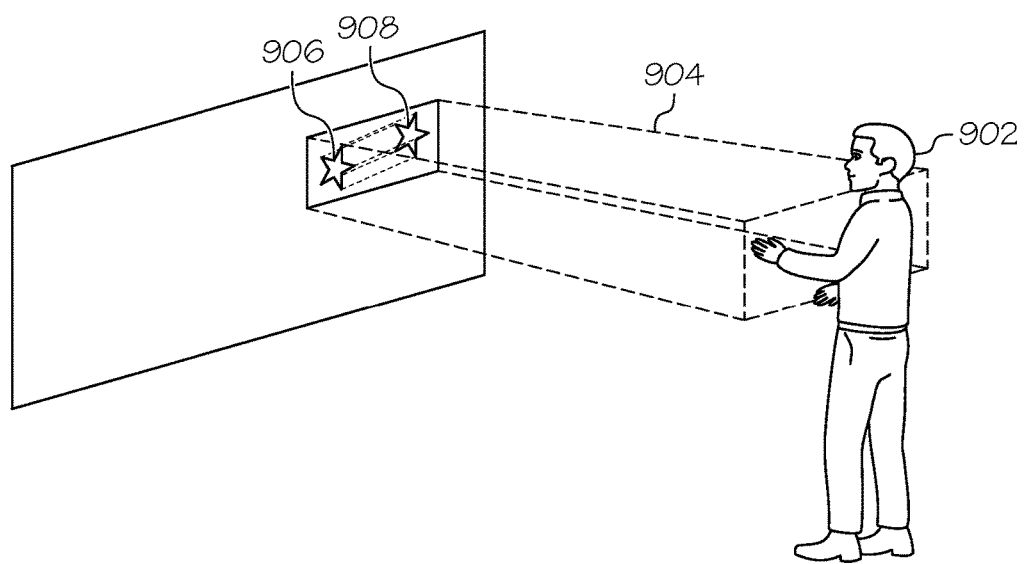
Figure 10:
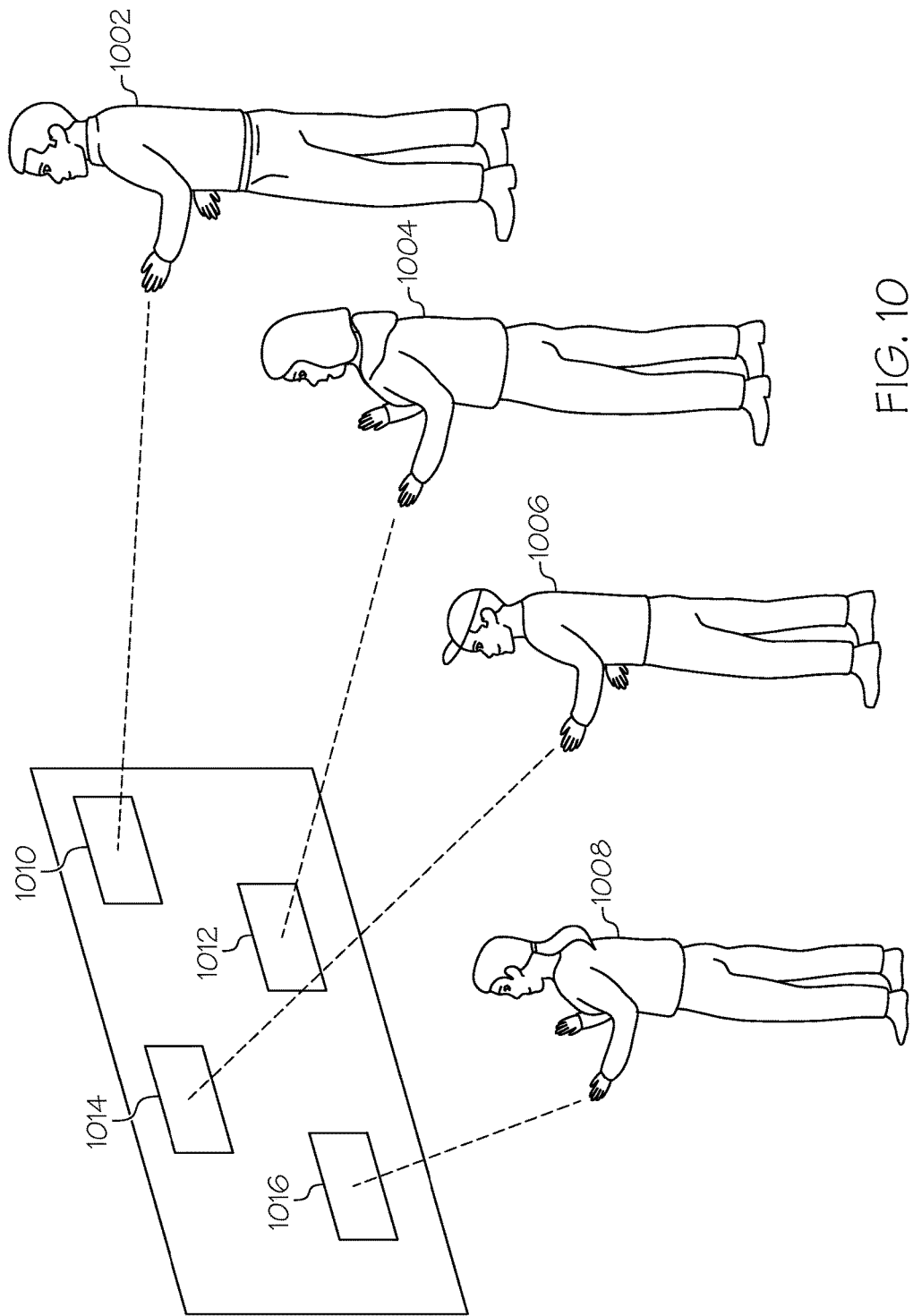

FIG. 8 illustrates how a user may perform a zoom interaction on a volumetric computing system. User 802 has his right hand 804 in volume 806, and his left hand 808 in volume 810. The user is moving his hands 804 and 808 away from each other while still staying in their respective volumes. This interaction is causes the information that is displayed on the screen to become larger. While, FIG. 9 illustrates a user 902 manipulating FIG. 906 across the region 910 to cover another FIG. 908. This gesture based interaction may be implemented by the designer or user to activate significant control functions. This application not only reduces risks associated with accidental control function activation, but also provides an instrument to devise user experience methods that potentially can improve user's engagement with the interactive system. In addition, FIG. 10 illustrates how multiple users 1002, 1004, 1006, and 1008 may have their individual regions 1010, 1012, 1014, and 1016, respectively, of the display 116 that each user is only permitted to interact within. This allows for efficiently prioritizing, scheduling and preempting of the user interaction.

Figure 11:
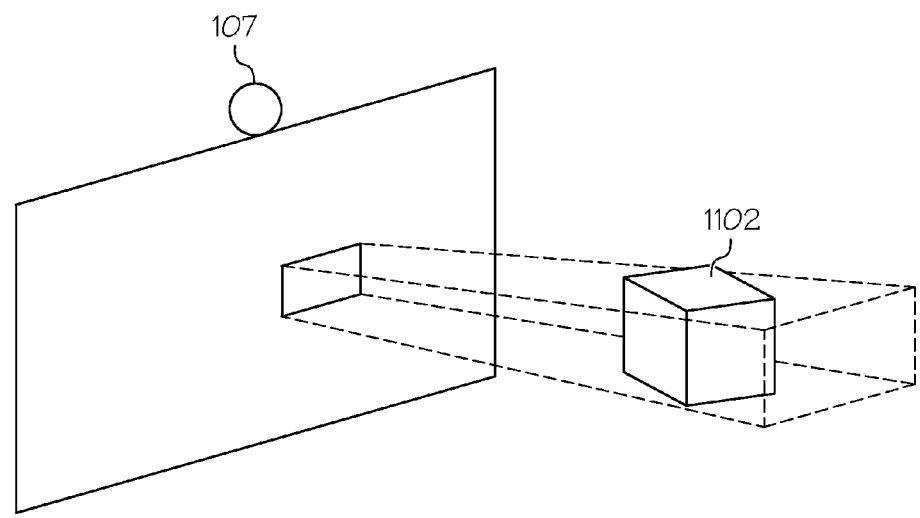
FIG. 11 illustrates how a object may be aligned using the volumetric computing system of FIG. 2.

FIG. 11 illustrates an exemplary embodiment of the volumetric computing system utilized to align an object. As described above the sensor 107 receives information about the location of the object 1102. It should be appreciated that the sensor 107 may be positioned such that it can rotate in a full circle around the axis to capture all objects within the predetermined distance of the volumes. This information then may be used to inform a user of the location of the object and which direction the object would need to turn to align it in the desired direction. For example, if the object 1102 was an aircraft on tarmac maneuvering itself to the gate. This system could be used to replace the ground crew that guides the aircraft to the proper location by signaling the pilot of which direction to turn. Alternatively, this may be used in a wheel alignment application, by directing the user to make the proper adjustments to align the wheels of an automobile.

Figure 12:
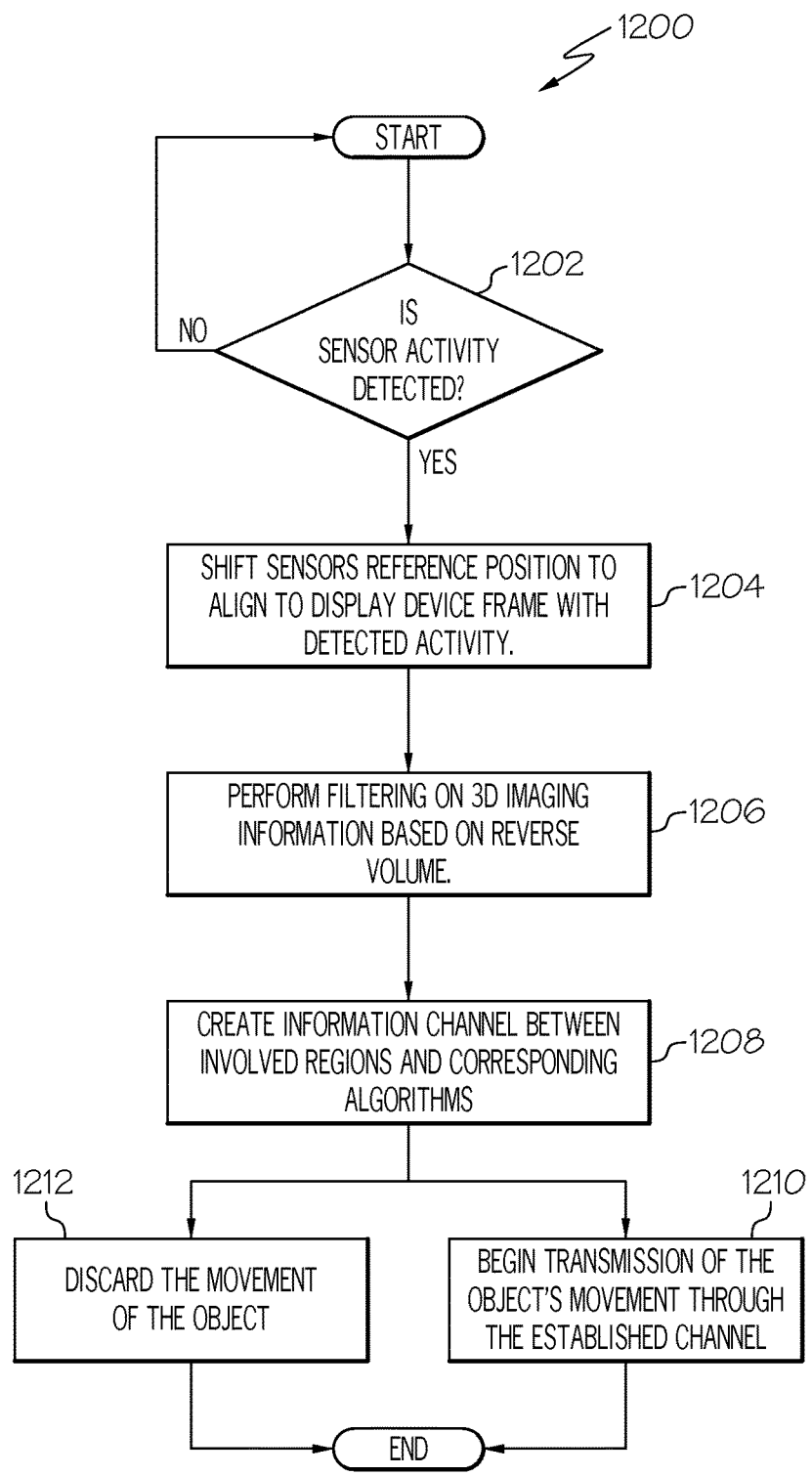
FIG. 12 is a flow chart of a volumetric computing process in accordance with an embodiment.

FIG. 12 is a flow chart 1200 of a volumetric computing process in accordance with an embodiment. In STEP 1202, the sensor detects user activity. If there is no activity detected, the process starts again until user activity is detected. The sensor then detects the location of the object(s) and shifts the sensed location to align to the frame of reference of the display device in STEP 1204. The location of the object is then compared with the generated volumes, and if the movement of the object is not within one of the volumes, then it is discarded in STEP 1206. Otherwise, an information channel between the involved regions and the corresponding algorithms are created in (STEP 1208). The movement of the object is then compared to the requirements of the algorithm and if the objects movement meets the requirements then the interaction is sent to the program interface (STEP 1210). Otherwise, the movement of the object is discarded (STEP 1212).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A method for analyzing an object's movement relative to a two dimensional (2D) display, the method comprising:
   associating a first region on the 2D display with a first function of a system, the first region having a size and location on the 2D display that is based on a significance of the first function;
   associating second region on the 2D display with a second function of the system, the second region having a size and location on the 2D display that is based on a significance of the second function, wherein the second significance is less than the first significance, and the first region and the second region do not overlap;
   detecting a location of the object;
   generating a first volume that is a projection of the first region toward the object;
   generating a second volume that is a projection of the second region toward the object;
   detecting a movement of the object;
   dividing the movement of the object into a first part that occurs within the first volume and a second part that occurs within the second volume; and
   comparing the first part to an algorithm comprising interaction requirements specific to the first volume and its respective function, and comparing the second part to an algorithm comprising interaction requirements specific to the second volume and its respective function.

2. The method of claim 1 wherein object is a user and the object's movement is a user's three-dimensional gesture.

3. The method of claim 1 wherein, for each volume, generating the volume comprises projecting a respective region from the 2D display towards the object for a distance of less than or equal to a maximum depth.

4. The method of claim 3 wherein, for each region, projecting the region comprises increasing the dimensions of the respective area as distance from the display increases.

5. The method of claim 1 further comprising, for each region, determining a maximum depth based on the location of the object and a significance and function of the respective region.

6. The method of claim 1 further comprising, for each volume, altering the shape of the volume based on the location of the object.

7. The method of claim 1 further comprising:
   for each volume, analyzing the part of the object's movement that occurs within the respective volume.

8. The method of claim 7 further comprising, for each volume, generating an information channel between the volume and an associated user defined algorithm.

9. The method of claim 1 further comprising:
   for each volume, discarding the object's movement that occurs in the volume when the object's movement does not meet requirements of the associated user defined algorithm; and
   accepting the object's movement that occurs in the volume when the object's movement meets requirements of the user defined algorithm.

10. A volumetric computing system onboard an aircraft, comprising:
    a 2D display;
    a sensor for sensing (i) a location of a user, and (ii) a user interaction; and
    a processor coupled to the 2D display and to the sensor and configured to (a) associate a first region on the 2D display with a first function of a system, the first region having a size and location on the 2D display that is based on a significance of the first function;
    (b) associate a second region on the 2D display with a second function of a system, the first region having a size and location on the 2D display that is based on a significance of the second function, wherein the second significance is less than the first significance, and the first region and the second region do not overlap; (c) generate (i) a first volume that is a projection of the first region toward the object, and iii) a second volume that is a projection of the second region toward the object (d) generate first interaction requirements specific to the first volume and second interaction requirements specific to the second volume; (e) determine a part of the user interaction that is within the first volume and meets the first interaction requirements; and (f) determine a part of the user interaction that is within the second volume and meets the second interaction requirements.

11. The system according to claim 10 wherein the processor is further configured to (i) alter the direction of the sensor, and (ii) project a respective region from the 2D display towards the user for a distance based upon a significance of the region and the location of the user.

12. The system according to claim 10 wherein the processor is further configured to for each volume, analyze the part of the user interaction that occurs within the volume.

13. The system according to claim 12 further comprising, for each volume, generating an information channel between the volume and an associated user defined algorithm.

* * * * *